US005896305A

United States Patent [19]
Bosshart et al.

[11] Patent Number: 5,896,305
[45] Date of Patent: Apr. 20, 1999

[54] SHIFTER CIRCUIT FOR AN ARITHMETIC LOGIC UNIT IN A MICROPROCESSOR

[75] Inventors: Patrick W. Bosshart; Quang Dieu An, both of Plano, Tex.

[73] Assignee: Texas Instruments Incorporated, Dallas, Tex.

[21] Appl. No.: 08/796,311

[22] Filed: Feb. 7, 1997

Related U.S. Application Data

[60] Provisional application No. 60/011,327, Feb. 8, 1996.

[51] Int. Cl.[6] .................................................... G06F 7/00
[52] U.S. Cl. ................................................... 364/715.08
[58] Field of Search ......................... 364/715.08; 341/67

[56] References Cited

U.S. PATENT DOCUMENTS

| | | | |
|---|---|---|---|
| 5,020,013 | 5/1991 | Maher, III et al. | 364/715.08 |
| 5,099,445 | 3/1992 | Studor et al. | 364/715.08 |
| 5,379,240 | 1/1995 | Byrne | 364/715.08 |
| 5,652,718 | 7/1997 | Thomson et al. | 364/715.08 |
| 5,682,339 | 10/1997 | Tam | 364/715.08 |
| 5,729,482 | 3/1998 | Worrell | 364/715.08 |

*Primary Examiner*—Tan V. Mai
*Attorney, Agent, or Firm*—Rebecca Mapstone Lake; Richard L. Donaldson; James F. Hollander

[57] ABSTRACT

A microprocessor (5) including a plurality of arithmetic logic units (42) is disclosed. At least one of the arithmetic logic units (42) includes a shifter circuit (50) for executing logical and arithmetic shift, rotate, and rotate-through-carry instructions in both the left and right directions, on data words of various lengths. The shifter (50) includes a series of input multiplexers (72, 74, 76, 78) for presenting the data word, carry bits, and extended sign bits to a first funnel shifter stage (80). Each of the multiplexers (72, 74, 76, 78) and first funnel shifter stage (80) are preferably realized by AND-OR-INVERT logic, to allow for 0 logic states and don't cares to be presented by the nonassertion of a control signal thereto. The shifter (50) is implemented as a right funnel shifter, with left shifts and rotates performed by presentation of the data word to the most significant bits of the first funnel shifter stage (80), followed by a right shift of the logical complement of the shift count. The first funnel shifter stage (80) is controlled by logic (84) that enforces a single bit position shift if the shift or rotate is in the left direction, contemplating at least the least significant bit of the shift count. A second funnel shifter stage (82) is provided to complete the shift or rotate execution by the most significant bits of the shift count, presented as the logical complement if the shift is in the left direction.

20 Claims, 9 Drawing Sheets

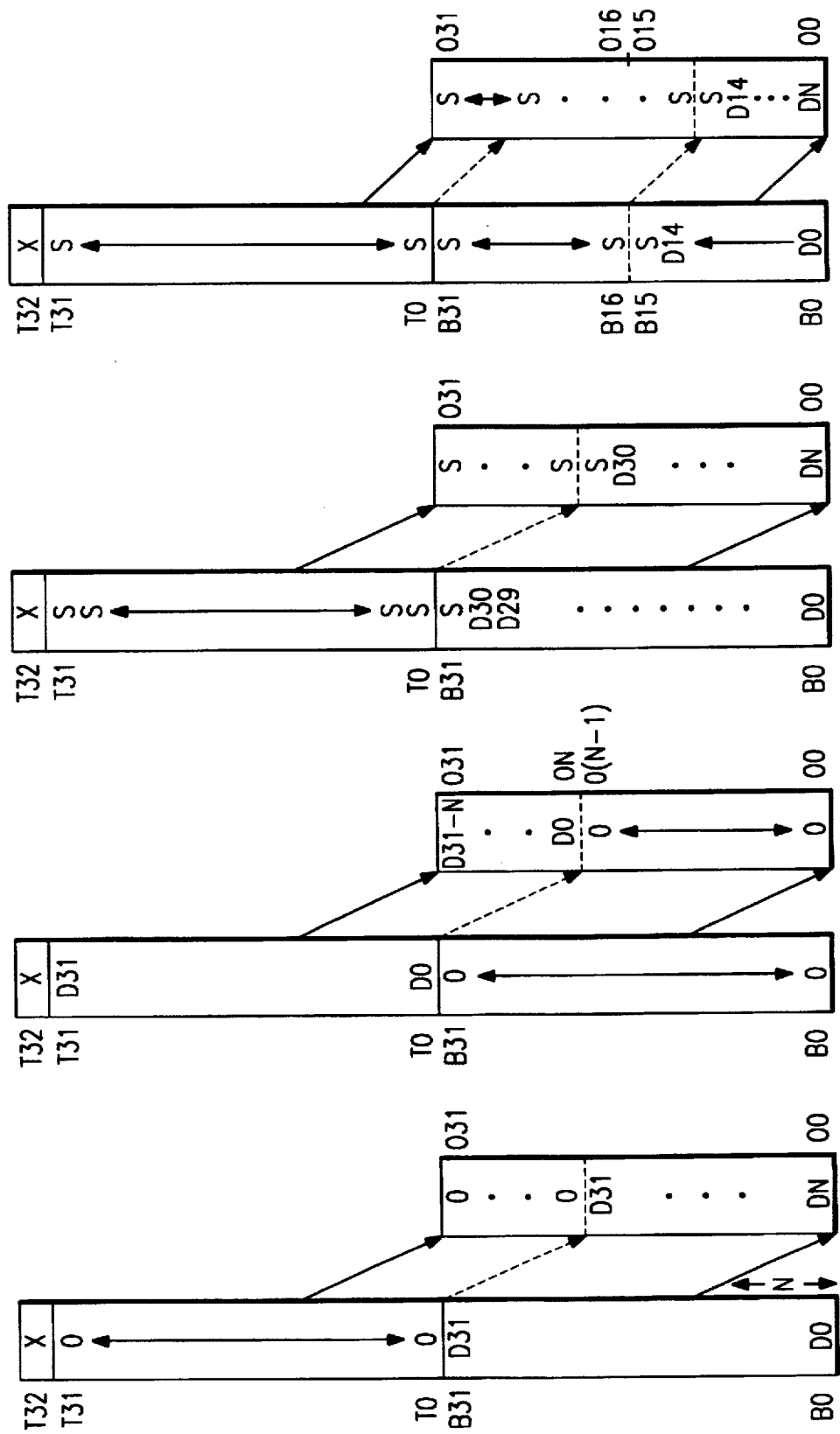

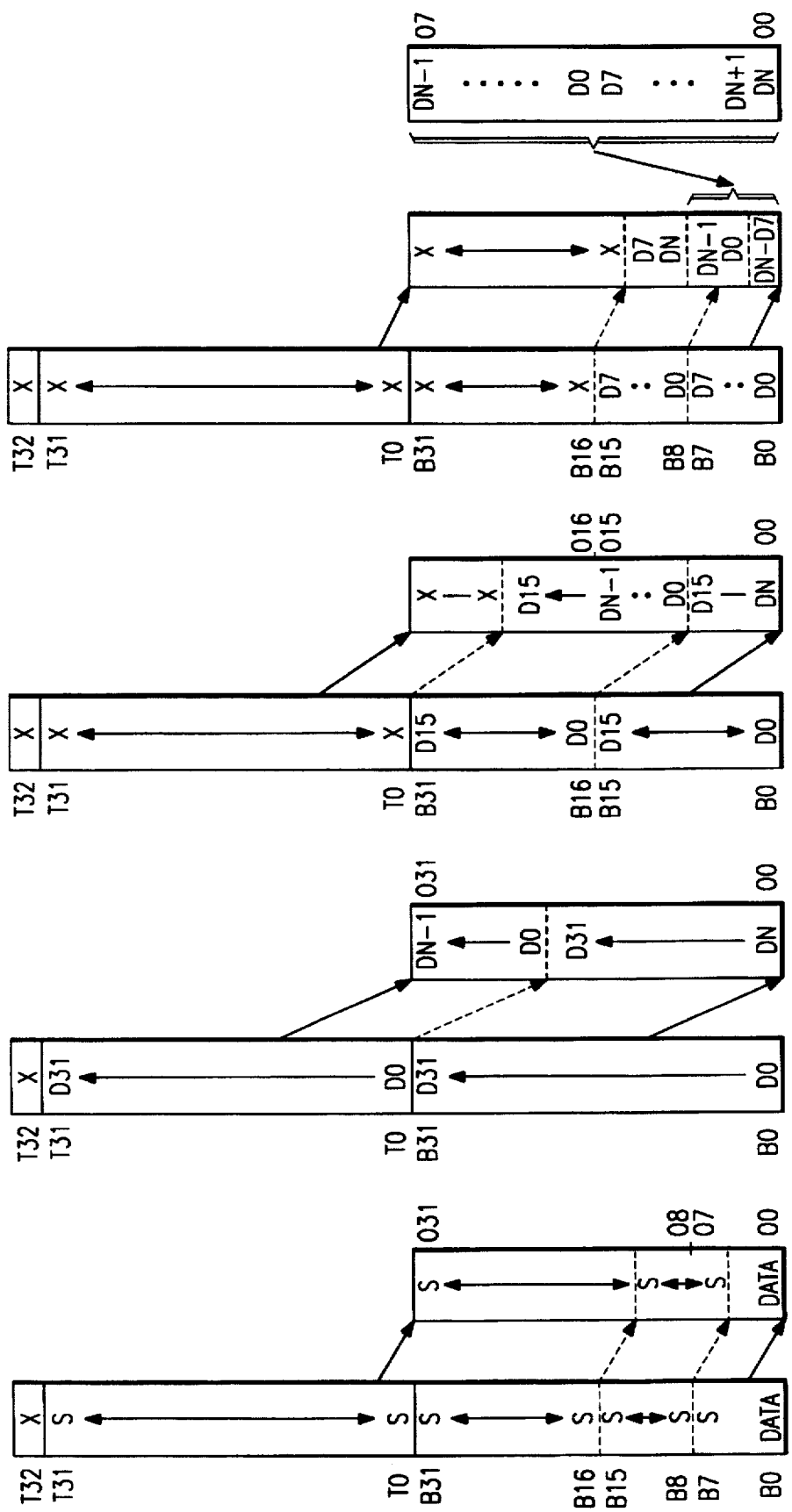

SHIFTER CIRCUIT FOR AN ARITHMETIC LOGIC UNIT IN A MICROPROCESSOR

This application claims priority under 35 USC 119(e)(1) of the provisional application Ser. No. 60/011,327, filed Feb. 8, 1996.

This invention is in the field of integrated microprocessor electronic circuits, and is more specifically directed to logical and arithmetic shifter circuits therein.

BACKGROUND OF THE INVENTION

As is fundamental in the field, conventional microprocessors of both the general purpose and application-specific types are called upon to perform certain arithmetic and logical operations upon digital data words. Arithmetic operations include typical addition and subtraction operations, for which conventional adder circuitry is provided. Other common operations in modern complex instruction set microprocessors include integer multiplication and division. As is well known in the field, multiplication and division by powers of two may be readily performed merely by way of shifting a digital data word to the left or right, respectively, by a specified number of bit positions. Non-power-of-two multiplication may, of course, be performed by the addition of the results of powers-of-two multiplication operations. In addition, arithmetic and logical operations of other types are also commonly performed by conventional microprocessors, typically indicated in the instruction set for the microprocessor. For example, microprocessors of the well-known x86-architecture type perform logical and arithmetic operations such as logical shifts (in both the left and right directions), arithmetic shifts which retain the sign information (in the right direction only, which is toward the least significant bit), rotates, and rotates which involve the carry bit (i.e., the carry bit, or flag, is rotated along with the data word).

As is also known in the art, in x86-architecture microprocessors of the so-called Pentium-class, which refers to microprocessors compatible with PENTIUM microprocessors available from Intel Corporation, may perform these types of logical and arithmetic operations may be performed on data words of varying length. Typically in these microprocessors, logical and arithmetic shifts, and rotates, may be performed on data words of eight, sixteen, or thirty-two bits in width. Shifter circuitry of the so-called "barrel shifter" type conventionally performs operations of these types. However, conventional barrel shifters typically occupy a large amount of integrated circuit chip area, dissipate a relatively large amount of power, and involve substantial propagation delays.

By way of further background, funnel shifters are known circuits for performing operations such as shifts and rotates. However, conventional funnel shifters are also quite inefficient in performing many of these operations, especially when the shifter must operate on data words of different lengths.

By way of still further background, funnel shifters for performing logical shifts and rotates in both directions, for a fixed operand size, are known in the art. However, these conventional funnel shifters are inadequate to support some complex instruction sets, such as those used with x86-architecture microprocessors, considering that these instruction sets require support for multiple operand sizes, and also for rotate-through-carry operations.

SUMMARY OF THE INVENTION

The invention may be implemented into a funnel shifter, in a manner particularly useful for performing logical and arithmetic shifts and rotates on variable length data words such as required by x86-architecture microprocessor instruction sets. According to the present invention, the funnel shifter includes a set of input multiplexers for presenting the input data word to the funnel shifter at the input bit locations appropriate for effecting the shift, with all shifts made in the right direction (i.e., toward the least significant bit). Left shifts of a specified shift count are performed by performing a right shift of 32 minus the shift count; preferably, by performing a shift of 32 positions by way of the input multiplexers, followed by the shifter performing an unconditional one-bit position right shift and a right shift by the logical complement of the shift count. Other minimization techniques are used to minimize the number of multiplexer control inputs, and thus provide an efficient shifter circuit. According to another aspect of the invention, the multiplexers are realized as AND-OR-INVERT combinations rather than as pass gates, to reduce the possibility of crowbar current, to require only single-ended control signals, and eliminating the need for a "0" data line.

It is an object of the present invention to provide a shifter circuit for efficiently performing shift and rotate operations on variable-length data words.

It is an object of the present invention to provide such a shifter circuit in which the propagation delay is reduced through combination of the necessary control circuits.

It is a further object of the present invention to provide such a shifter circuit that is implemented as a funnel shifter.

It is a further object of the present invention to provide such a shifter circuit that provides shift and rotate capabilities according to x86-architecture instructions.

Other objects and advantages of the present invention will be apparent to those of ordinary skill in the art having reference to the following specification together with its drawings.

DETAILED DESCRIPTION OF THE PREFERRED EMBODIMENT

Figure 1:
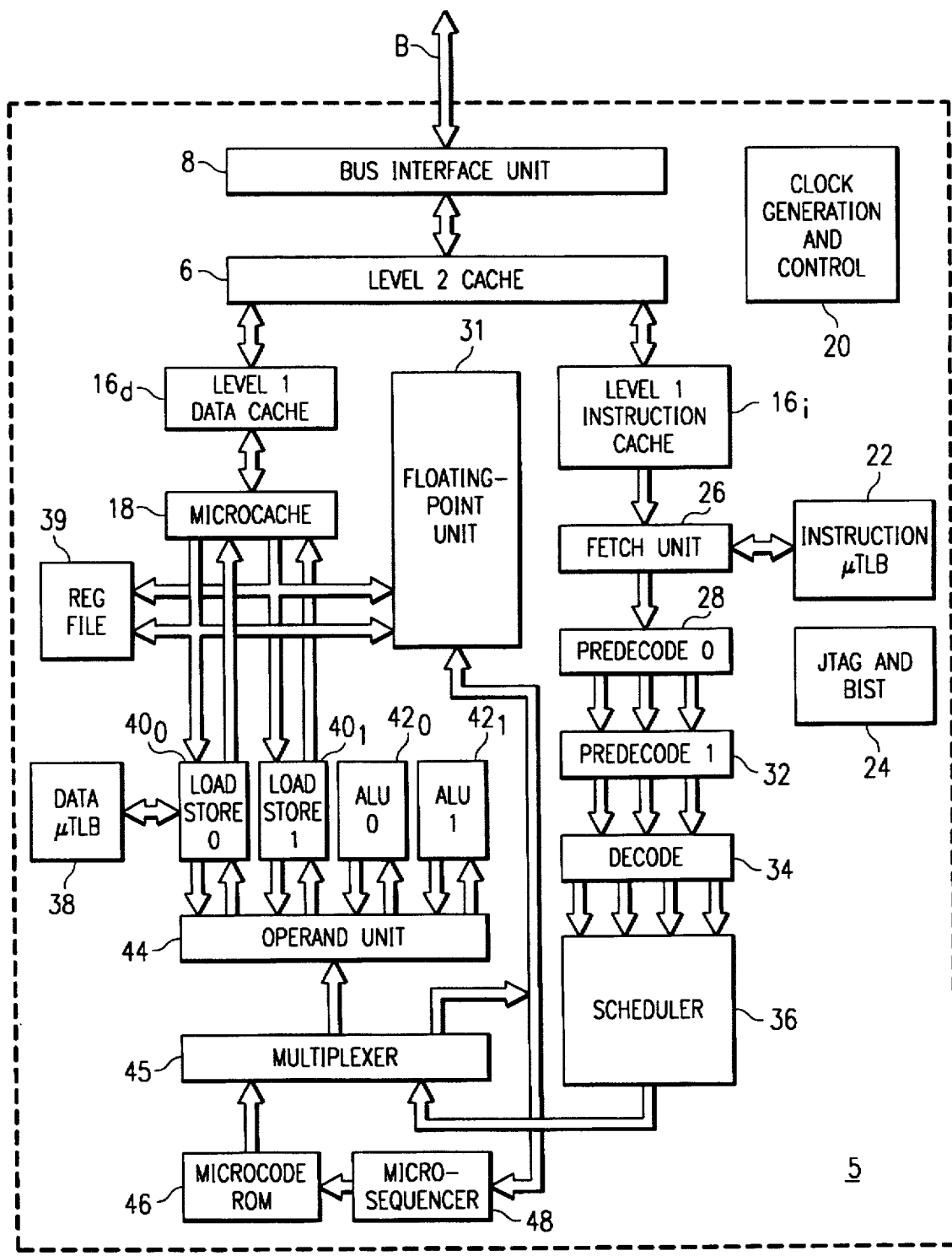
FIG. 1 is an electrical diagram, in block form, of a microprocessor according to the present invention.

Referring first to FIG. 1, microprocessor 5 according to the preferred embodiment of the invention is illustrated in block diagram form, and will now be described. Microprocessor 5 includes bus interface unit (BIU) 8 connected to bus B, which controls and effects communication between microprocessor 5 and the other elements in system 2. As is typical for x86-architecture systems, bus B will include an address bus, a data bus, and a control bus, each separate from one another, by way of which microprocessor 5 communicates with other system functions, generally via control circuits commonly referred to as a "chipset". BIU 8 includes the appropriate control and clock circuitry to perform this function, including write buffers for increasing the speed of operation, and including timing circuitry so as to synchronize the results of internal microprocessor operation with bus B timing constraints. Microprocessor 5 also includes clock generation and control circuitry 20 which, in this example, generates internal clock phases based upon the bus clock from bus B; the frequency of the internal clock phases, in this example, may be selectably programmed as a multiple of the frequency of the bus clock.

As is evident in FIG. 1, microprocessor 5 has three levels of internal cache memory, with the highest of these as level 2 cache 6, which is connected to BIU 8. In this example, level 2 cache 6 is a unified cache, and is configured to receive all cacheable data and cacheable instructions from bus B via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 5 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer (μTLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

Referring back to FIG. 1, the pipeline stages noted above are performed by various functional blocks within microprocessor 5. Fetch unit 26 generates instruction addresses from the instruction pointer by way of instruction microtranslation lookaside buffer (μTLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from sequencer 44 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test functions, ensuring the validity of the operation of microprocessor 5 upon completion of manufacturing, and upon resets and other events.

Figure 2:
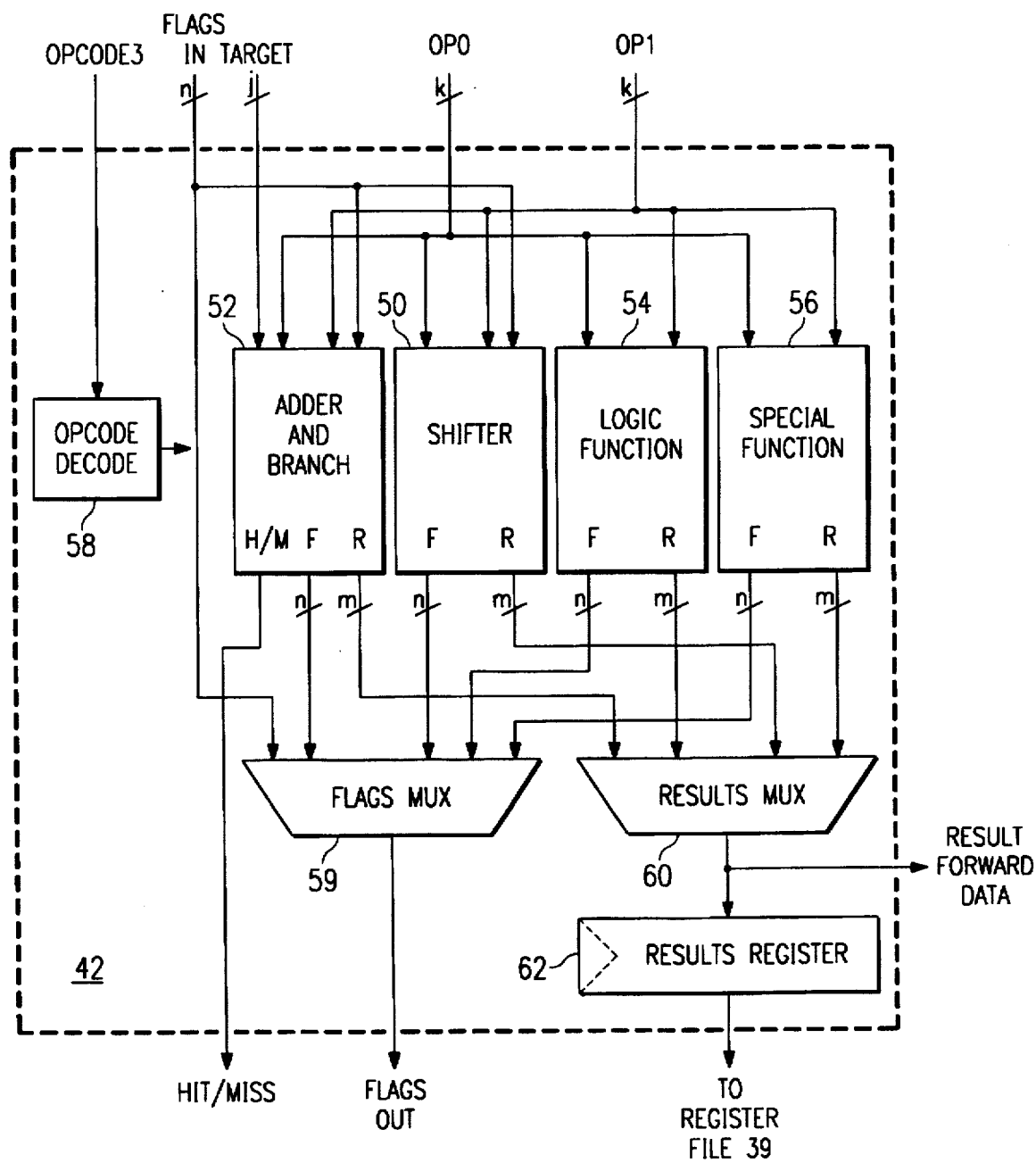
FIG. 2 is an electrical diagram, in block form, of one of the arithmetic-logic units in the microprocessor of FIG. 1.

Referring now to FIG. 2, the construction of one of ALUs 42 according to the preferred embodiment of the invention will now be described in detail. In the superscalar architecture of microprocessor 5, each of ALUs 42 will, of course, be similarly constructed in the manner shown in FIG. 2. Alternatively, if microprocessor 5 is of the scalar type, only one ALU 42 constructed as shown in FIG. 2 will be provided.

ALU 42 according to this preferred embodiment of the invention receives operand inputs on buses OP0 and OP1, upon which the operations of ALU 42 will be carried out. Status inputs are provided to ALU 42 on bus FLAGS IN, and AOps opcodes are provided to opcode decoder 58 in ALU 42 on bus OPCODES. Opcode decoder 58 decodes the values of the AOps presented to ALU 42, and controls the operation of the various functional blocks in ALU 42 accordingly, by way of control lines (not shown in FIG. 2). ALU 42 also receives an input on bus TARGET corresponding to the target of a conditional branch instruction, as will be briefly discussed below.

The operational circuitry of ALU 42 includes shifter circuit 50, which will be described in detail hereinbelow. Shifter 50 receives status inputs from bus FLAGS IN, and operands from operand buses OP0, OP1, and provides status results at its flags outputs F and results of the operation on its results outputs R. The flag outputs F from shifter 50 are forwarded to an input of flags multiplexer 59; similarly, the results outputs R from shifter 50 are forwarded to results multiplexer 60.

Similarly, the other functional blocks of ALU 42 receive inputs from the input buses and provide outputs to flags multiplexer 59 and results multiplexer 60. Adder/branch circuit 52 is provided in ALU 42, for performing arithmetic operations such as adding and subtracting of operands on operand buses OP0, OP1, as may be controlled by status flags such as carry and overflow. Adder/branch circuit 52, in this example, is also for executing branches of various types (direct, conditional, or unconditional relative) based upon one or more operands from operand buses OP0, OP1, and the value presented on bus TARGET; adder/branch circuit 52 presents the result of speculative execution on line HIT/MISS. Flag logic in adder/branch circuit 52 also presents status flags (e.g., sign, carry, overflow, zero, parity) at its flags output F to flags multiplexer 59, while the results of the operations are presented at results output R to results multiplexer 60.

Logic function block 54 executes basic logic instructions (AND, OR, XOR, NAND, NOR, etc.) upon operands from operand buses OP0, OP1, according to the AOps decoded by opcode decoder 48. The results of such operations are presented at results outputs R to results multiplexer 60, with status flags (sign, zero, parity, etc.) presented at flags outputs F to flags multiplexer 59.

Special function block 56 is provided in ALU 42 to perform special instructions such as the x86-architecture instructions Brev, Cmp2, Se8/16, Ze8/16, and the like. The status flags and results of such special instructions at the flags outputs F and results outputs R of special function block 56 are presented to flags multiplexer 59 and results multiplexer 60, as in the case of the other functional blocks of execution unit 42.

Flags multiplexer 59 and results multiplexer 60 are controlled by opcode decoder 58 to select the appropriate one of their respective inputs for forwarding to bus FLAGS OUT and to result register 62, respectively. According to this example, the output of results multiplexer 60 may also be forwarded along a result forward path to another one of the execution units, for use in the execution of parallel instructions in superscalar microprocessor 5. Results register 62 is a temporary storage location, which retains the results of the previous operation until register file 39 is able to receive the same in the write-back operation. Flags multiplexer combines the status flags on bus FLAGS IN with those generated from ALU 42 itself to provide new status flags on bus FLAGS OUT.

As indicated hereinabove, certain shift and rotate functions are specified in the instruction set of x86-architecture microprocessors, including Pentium-class microprocessors. According to this embodiment of the invention, shifter 50 is constructed to perform these functions in an efficient manner, primarily by its operation as a funnel shifter. Referring now to FIGS. 3a through 3n, the shift and rotate functions performed by shifter 50 according to the preferred embodiment of the invention will be described by way of a register-level description. The construction of shifter 50, and its operation in so performing these functions, will be described in further detail hereinbelow.

In general, as will be shown in detail hereinbelow, shifter 50 is of the funnel shifter type, having sixty-five input bits and thirty-two output bits (a thirty-third output bit is also provided for use in certain rotate-through-carry instructions as will be described hereinbelow). In the diagrams of FIGS. 3a through 3n, the input bits are shown in the left-hand register and are separated, for purposes of nomenclature, into the bottom thirty-two bits (i.e., B0 through B31), and the top thirty-three bits (i.e., T0 through T32). The thirty-two output bits are labeled O0 through O31 in the Figures. As is well known in the art, funnel shifters are circuits which select the number of the input bits corresponding to its output width for presentation at the output; the bit positions of the selected input bits is determined by the value of the shift count. The shift count is an argument in the shift or rotate instruction. As will be evident from the following description, funnel shifter 50 executes all shift and rotate instructions by way of a right shift, regardless of the direction of the shift or rotate indicated by the instruction. Left shifts, and other more complex operations such as rotate-through-carry, for data word sizes of eight bits, sixteen bits, or thirty-two bits, are effected by the right shift of shifter 50 through the presentation of the data words to the appropriate input bit locations. For these instructions, the shift count is a five-bit value (i.e., specifies shifts of from 0 to 31 bit positions); the most significant bits of the shift count are ignored for shifts and rotates of operand sizes of less than thirty-two bits.

Referring first to FIG. 3a, a shift-right-logical operation (SHR) is illustrated. As is well known in the art, this operation shifts the operand data word to the right, toward the least significant bit by the specified shift count, filling in the most significant bits with zeroes. FIG. 3a illustrates this operation as performed by funnel shifter 50. Top bit positions T0 through T31 are filled with zeroes, and topmost bit position T32 is a don't care (as it will never appear in the output, even for a thirty-two bit shift). The input data word, comprised of input data bits D0 through D31, is presented to bottom input bit positions B0 through B31. The right-shift (logical) is then performed by funnel shifter 50 selecting, for presentation at the output, the thirty-two bit positions beginning with bit position N, where N is the shift count argument of the instruction. As such, the output bit position O0 receives input data bit $D_N$, with the remainder of the input data word filling respective output bit positions O1 et seq. until exhausted, following which the remainder of output bit positions O (i.e., the N most significant output bit positions) are filled with zeroes, as shown in FIG. 3a. The right-shift-logical operation is identical for each of the possible data word sizes (8, 16 and 32 bits), so long as the bit positions beyond the sixteen or eight bit data words, as the case may be, are set to zero.

FIG. 3b illustrates the execution of a left-shift-logical (SHL) by funnel shifter 50 according to this embodiment of the invention. As noted above, shifter 50 only shifts to the right. Therefore, a logical left-shift of N positions is performed by shifter 50 first shifting the input data word by thirty-two positions to the left, followed by a logical right-shift of (32−N) bit positions. This is performed, as shown in FIG. 3b, by shifter 50 placing all zeroes in the bottom input bit positions B0 through B31, placing the input data bits D0 through D31 in top input bit positions T0 through T31 (topmost input bit position T32 is a don't care). This positioning of the input data word amounts to a left shift of 32 bit positions. A right shift by (32−N) is then executed, resulting in the first N positions of the output bit positions O0 through O(N−1) being filled with zeroes, and the remainder of the 32 output bit positions receiving the N least significant bits D0 through D(31−N) of the input data word. This instruction is also performed identically for all of the possible data word sizes.

As will be described in further detail hereinbelow, shifter 50 according to this embodiment of the invention more efficiently performs the left shift-logical by performing its right shift by 1+N, implemented as a shift right of one bit position, followed by a shift right of N bit positions (which is equivalent to shifting right by 32−N). This allows the right shift count to be determined by a simple logical inversion of the shift count argument of the instruction, rather than by a subtraction, which would require use of an adder, lengthening the associated execution time.

Referring now to FIG. 3c, the execution of a shift-right-arithmetic (SAR) for a thirty-two bit data word by shifter 50 constructed according to this preferred embodiment of the invention, will now be described. As is known in the art, this operation is a right shift of the input data word considering its most significant bit as the sign bit; rather than filling the MSBs of the output bit positions with zeroes as in the logical shifts, the shift-right-arithmetic fills these bit positions with the sign bit. As will be noted below, the shift-right-arithmetic operations are executed differently for the different data word sizes. As shown in FIG. 3c, shifter 50 places the 32-bit input data word into the bottom input bit positions B0 through B31, respectively, with the sign bit occupying bottom bit position B31. Top input bit positions T0 through T31 each receive the sign bit S; the topmost input bit position T32 is a don't care. The 32-bit shift-right-arithmetic is then executed by shifter 50 selecting the contents $D_N$ of bottom input bit position BN for output bit position O0; the remainder of the input data word then fills the respective output bit positions O (up to input data bit D30 occupying output bit position O(30−N)); the most-significant output bit positions O(30−N+1) through O31 each receive the sign bit.

The 16-bit shift-right-arithmetic (SAR) is illustrated in FIG. 3d. The operation of shifter 50 in performing this operation is identical to that shown in FIG. 3c, except that the signed sixteen-bit input data word only occupies the bottom input bit positions B0 through B15 (with the sign bit S in bit position B15); copies of the sign bit S occupy bottom input bit position B16 and all higher bit positions up through top input bit position T31. Similarly, as shown in FIG. 3e, the 8-bit shift-right-arithmetic is performed by shifter 50 placing the signed eight-bit data word into bottom input bit positions B0 through B7 (sign bit S placed in bit position B7), with copies of the sign bit S placed into the remaining most significant bottom input bit positions B8 through B31 and into top input bit positions T0 through T31 (topmost input bit position T32 is again a don't care). The right shift performed by shifter 50 thus, in each case, accepts the MSBs of the input data word beyond the shift count N, with the sign bit S filling the remainder of the output bit positions O.

Referring now to FIG. 3f, the execution of 32-bit rotate right (ROR) or rotate left (ROL) instructions by shifter 50 will now be described. As is known in the art, a logical rotate (ROT) may be considered without regard to direction, as a rotate-right (ROR) by N is equivalent (in the 32-bit case) to a rotate-left (ROL) by 32−N (or rotate-left by 32 plus rotate-right by 1+$\overline{N}$). As shown in FIG. 3f, the 32-bit rotate is performed by shifter 50 loading a copy of the 32-bit input data bits $D_0$ through $D_{31}$ both into bottom input bit positions B0 through B31 and also into top input bit positions T0 through T31. The rotate is then effected by a right shift by the shift count N. As a result, output bit position O0 contains input data bit $D_N$, with the remainder of the input data word D presented in sequence in output bit positions O, and wrapping around, with output bit position O31 containing input data bit $D_{N-1}$, as shown in FIG. 3f.

FIG. 3g illustrates the execution of a 16-bit rotate instruction. In this case, shifter 50 presents two copies of the sixteen-bit input data bits $D_0$ through $D_{15}$ into bottom input bit positions B0 through B15 and B16 through B31; top input bit positions T0 through T32 are don't cares. The rotate is then performed by a right shift by the shift count N (i.e., the least four significant bits of the five-bit shift count; the most significant bit of the shift count being ignored), such that input data bit $D_N$ is placed into output bit position B0, and input data word D wrapping around so that output bit position B15 contains input data bit $D_{N-1}$. For this 16-bit instruction, only the sixteen least significant bit positions B0 through B15 are used; output bit positions B16 through B31 are don't cares. An 8-bit rotate is similarly performed by shifter 50, as illustrated in FIG. 3h. In this case, the two copies of the 8-bit input data bits $D_0$ through $D_7$ are placed into bottom input bit positions B0 through B7 and B8 through B15, respectively; the other input bit positions B16 through B31 and T0 through T32 are don't cares. The right shift by count N (i.e., the least three significant bits of the five-bit shift count; the two most significant bits of the shift count being ignored), then arranges the input data word D in the appropriate position, as shown in FIG. 3h, with input data bit $D_N$ in output bit position B0 and wrapping around so that input data bit $D_{N-1}$ is present in output bit position B7.

Figures 3I, 3J, 3K, 3L:
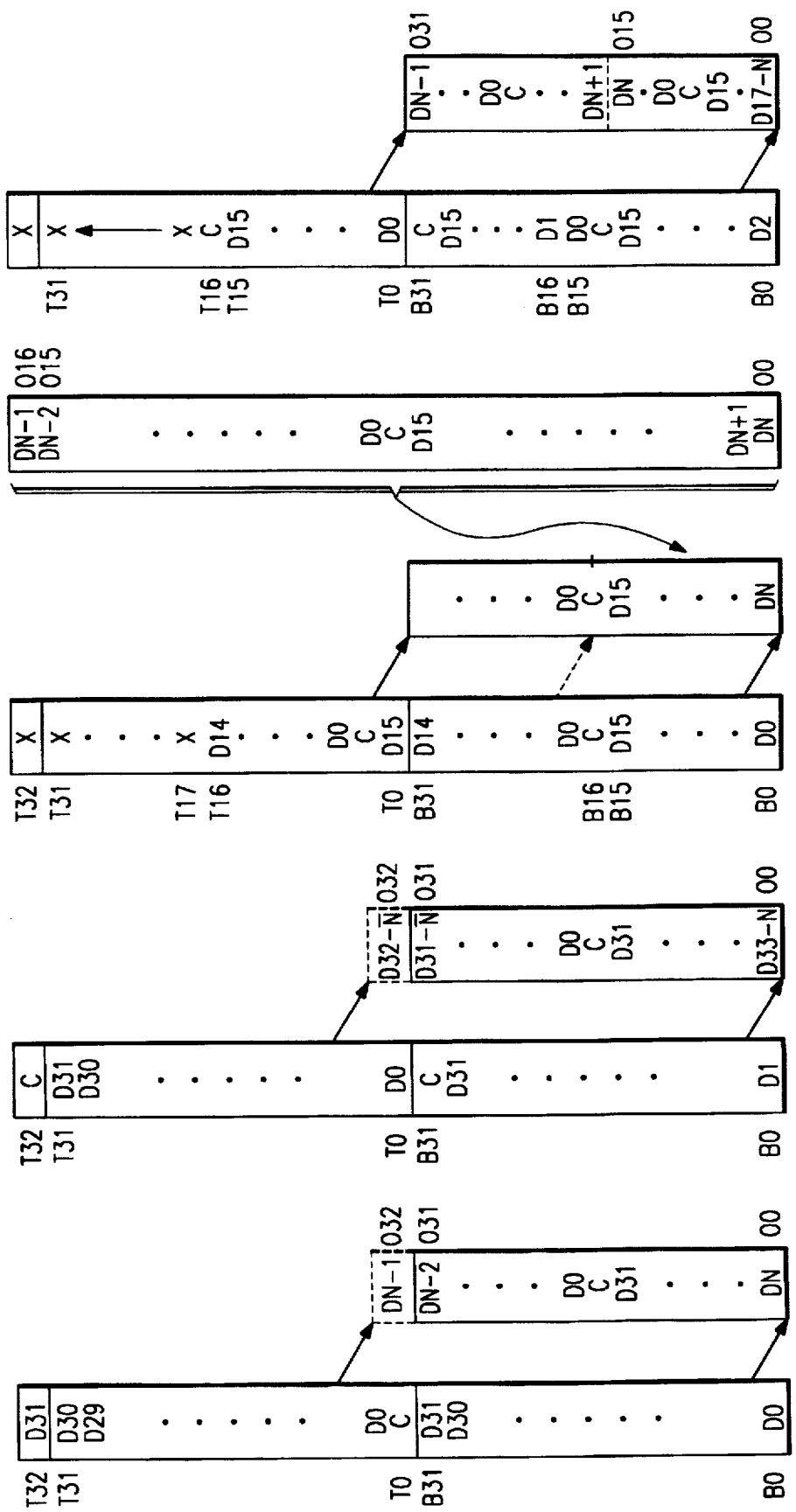
FIGS. 3a through 3n are register-level diagrams illustrating the shifts and rotates as performed by the shifter circuit according to the preferred embodiment of the invention, as implemented within the arithmetic logic unit of FIG. 2.

Referring now to FIG. 3i, the execution of a 32-bit rotate-through-carry right (RCR 32) instruction by shifter 50 will be described. As is known in the art, a rotate-through-carry instruction rotates the entire data word along with the carry bit from the flags register; in performing the rotate, the carry bit is external to the data word, in that a thirty-two bit data word is rotated along with the carry bit in the next (i.e., thirty-third) bit position. In this way, as will be described hereinbelow, a thirty-two bit rotate-through-carry (in either direction) requires the use of the thirty-third output bit to provide the full result.

As shown in FIG. 3i, the 32-bit rotate-through-carry right is performed by shifter 50 by its presentation of the input data into bottom input bit positions B0 through B31, respectively. The input carry bit C is placed into top input bit position T0, and another copy of input data bits $D_0$ through $D_{31}$ are placed into top input bit positions T1 through T32 (note that topmost input bit position T32 is used in this 32-bit rotate-through-carry execution). The rotate is then effected by shifter 50 performing a right shift by the count N, placing input data bit $D_N$ in output bit position O0, with the input data word D wrapping around. In this case, output bit position O32 contains input data bit $D_{N-1}$, which is forwarded to the carry flag via flag generation logic 85.

FIG. 3j illustrates the operation of shifter 50 in performing a 32-bit rotate-through-carry left (RCL 32). The rotate-through-carry left is effectively performed by way of a 32-bit rotate left (with carry), followed by a shift right of 32−N (or, as will be described hereinbelow, a shift right of 1 followed by a shift right of $\overline{N}$). In this case, input data bits $D_0$ through $D_{31}$ are placed into top input bit positions B0 through B31, respectively, with topmost input bit position T32 containing the input carry bit C. Bottom input bit positions B0 through B30 receive input data bits $D_1$ through $D_{31}$, respectively, and bottom input bit position B31 receives the input carry bit C. The rotate is then performed by a shift right by the value of 32−N (either as a subtraction result or as 1+$\overline{N}$). Output bit position O32 thus receives input data bit $D_{32-N}$, which is forwarded as the carry flag. The remainder of input data word D wraps around, such that output bit position O0 receives input data bit $D_{33-N}$. Again, the output size is thirty-three bits for this instruction, including the rotated thirty-two bit data word with the carry bit C.

Referring now to FIG. 3k, the execution of a 16-bit rotate-through-carry right (RCR 16) by shifter 50 is illustrated. For this instruction, shifter 50 places a copy of input data bits $D_0$ through $D1_5$ into bottom input bit positions B0 through B15, the input carry bit C into bottom input bit position B16, a copy of input data bits $D_0$ through $D_{15}$ into bottom input bit position B17 through top input bit position T1, followed by another copy of input data bits $D_0$ through $D_{14}$ into top input bit positions T2 through T16; the remaining top input bit positions T17 through T32 are don't cares. The rotate is then effected by a right shift by the five-bit shift count N, such that output bit position O0 receives input data bit $D_N$, the input data word D wraps around to fill the remainder of the output bit positions, including input carry bit C located between input data bits $D_{15}$ and $D_0$. The output size for this instruction is seventeen bits (16-bit data word with carry), and as such output bit position O16 will contain input data bit $D_{N-1}$ for forwarding as the carry flag.

FIG. 3l illustrates the execution of a 16-bit rotate-through-carry left (RCL 16). As in the case of the 32-bit rotate-through-carry, the input data word is loaded, with carry, from the "top-down", and the output is taken from the LSBs of output bit positions O. As a result, top input bit positions T0 through T16 receive input data bits $D_0$ through $D_{15}$ with carry C, respectively; topmost input data bits T17 through T32 are don't cares. Repeated copies of input data bits input data bits $D_0$ through $D_{15}$ with carry C are then loaded into bottom input bit positions B0 through B15, in a top-down fashion, such that bottom input bit positions B15 through B30 receive input data bits $D_0$ through $D_{15}$, bottom input bit positions B31 and B14 both receive the carry C, and bottom-most input bit positions B0 through B13 receive input data bits $D_2$ through $D_5$. Based upon the five-bit shift count N, the rotate is effected by a right shift of the value (32-N), or rather by a right shift of one position and a right shift of $\overline{N}$ positions. As a result, output bit positions O0 through O16 contain the rotated input data bits $D_{17-N}$ through $D_{N+1}$ with input carry bit C located between input data bits $D_{15}$ and $D_0$, as before.

Figure 3M:
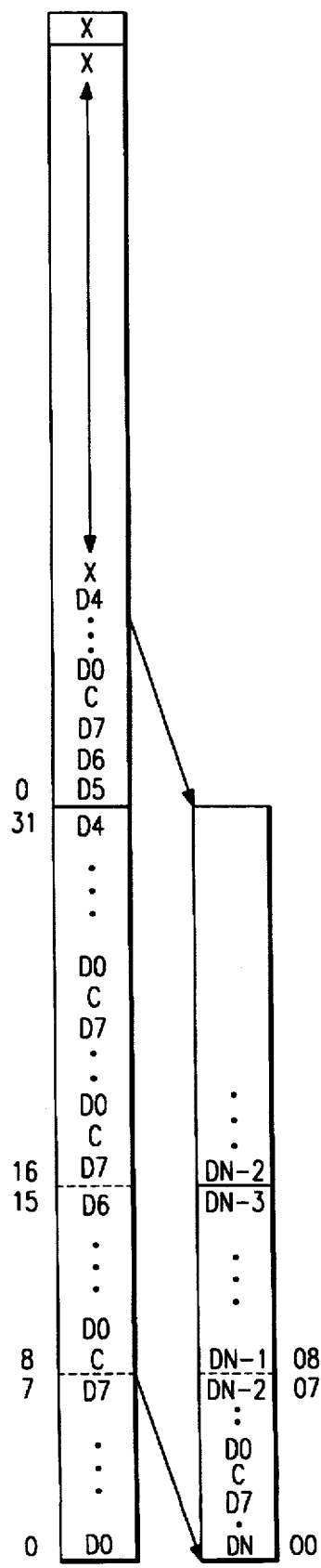
Figure 3N:
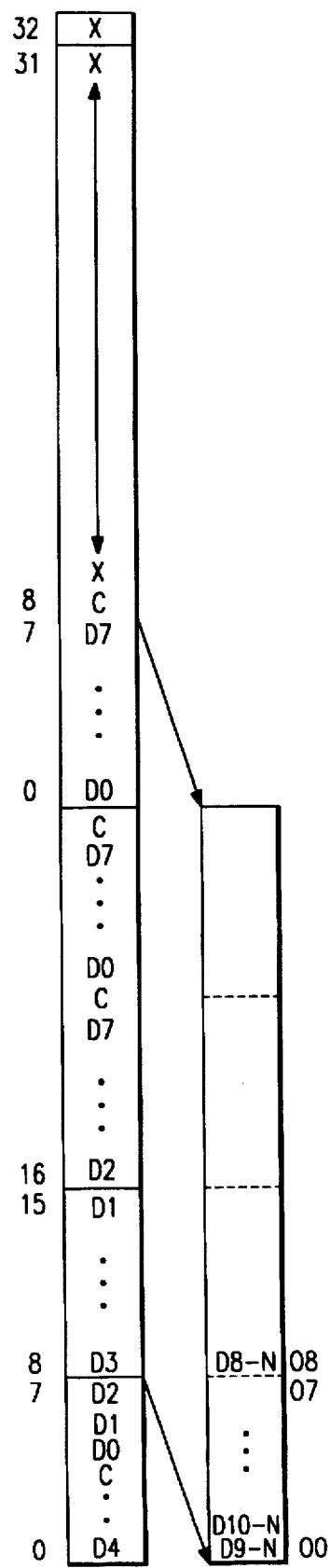

FIG. 3m illustrates the execution of an 8-bit rotate-through-carry-right (RCR 8) by shifter 50 according to the preferred embodiment of the invention. As shown in FIG. 3m, the eight input data bits $D_0$ through $D_7$, followed by carry C, are placed into bottom input bit positions B0 through B8; repeated copies of these nine bits are also loaded into input bit positions beginning with input bit position B9 and continuing up until top input bit position T8 (containing input data bit $D_4$), beyond which don't cares may be entered. The rotate is then effected by a right shift by the five-bit count N, such that the rotated data word appears in the output bit positions beginning with input data bit $D_N$ in output bit position O0, and input data bit $D_{N-1}$ in output bit position O8 (for forwarding as the carry flag); input carry bit C appears between data bit $D_7$ and data bit $D_0$ in this output sequence, as before.

FIG. 3n illustrates the execution of an 8-bit rotate-through-carry-left (RCL 8) by shifter 50. For this instruction, the output will be considered as the nine least significant output bit positions O8 through O0. As such, shifter 50 places input data bits $D_0$ through $D_7$ with carry C into top input bit positions T0 through T8; top input bit positions T9 through T32 are don't cares. Bottom input bit positions B31 through B0 receive copies of input data bits $D_0$ through $D_7$ with carry C, loaded in top-down fashion, with bottom input bit position B31 receiving the input carry bit C and with bottom-most input bit position B0 receiving input data bit $D_4$. The rotate is then again effected by a right shift of (32–N), or by a right shift of 1 followed by a right shift of $\overline{N}$. As a result, the rotated input data word D is presented in the nine least significant output bit positions B0 through B8, with input data bit $D_{9-N}$ in output bit position O0, input data bit $D_{8-N}$ in output bit position O8 (for forwarding as the carry flag), and with input carry bit C located in the output sequence between input data bits $D_7$ and $D_0$.

Figure 4:
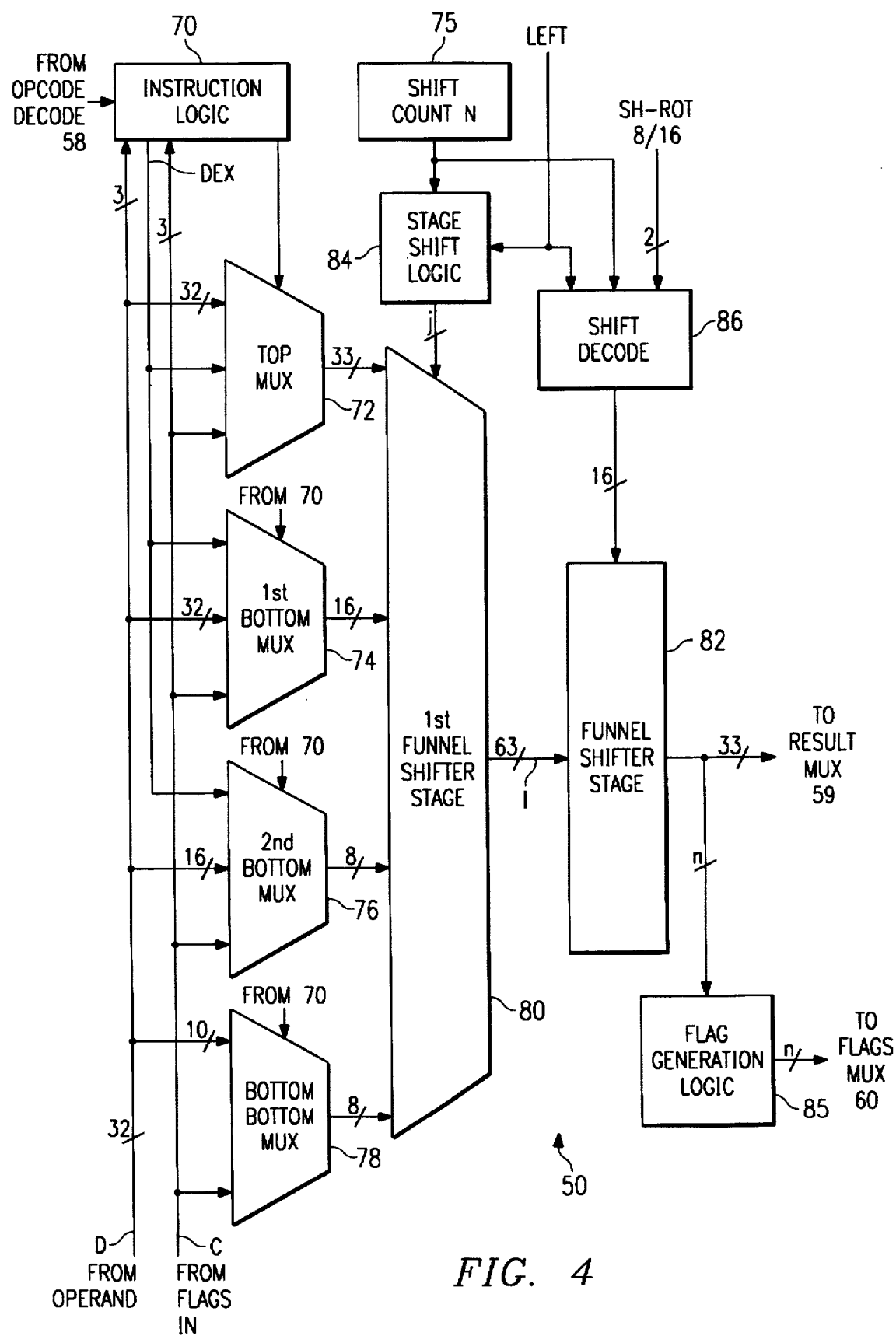
FIG. 4 is an electrical diagram, in schematic form, of the shifter circuit according to the preferred embodiment of the invention.

It has been discovered in connection with the present invention that the above operations may be logically combined so as to construct shifter 50 as a series of multiplexers with relatively few control signals. Referring now to FIG. 4, the construction of shifter 50 according to the preferred embodiment of the present invention will now be described.

As shown in FIG. 4, shifter 50 includes a set of multiplexers 72, 74, 76, 78, which present, in this exemplary embodiment of the invention, a selected set of sixty-five data input bits to the inputs of a first funnel shifter stage 80. First funnel shifter stage 80 presents a selected sixty-three data output bits to second funnel shifter stage 82, thus providing a right shift of from zero to two bit positions, under the control of stage shift logic 84 in response to a directional signal LEFT and to the shift count N stored in shift count register 75. In this example, the maximum word length operated upon by shifter 50 is thirty-two bits, and as such shift count register 75 is a five-bit register since the maximum shift length is 31. The sixty-three bits presented to second funnel shifter stage 82 are then shifted into a thirty-three bit output according to decoded shift signals generated by shift decode 86, responsive also to directional signal LEFT and the shift count N and to signals indicating whether 8-bit or 16-bit shifts and rotates are being performed. The output of second funnel shifter stage 82 is presented to results multiplexer 59. Flag generation logic 85 also receives the output of second funnel shifter stage 82, and generates flags in the conventional manner for application to flags multiplexer 60.

The operation of multiplexers 72, 74, 76, 78 is under the control of instruction logic 70, which receives control lines from opcode decoder 58 (shown in FIG. 2), and which controls multiplexers 72, 74, 76, 78 in the manner to be described in further detail hereinbelow. The inputs presented to multiplexers 72, 74, 76, 78, include the thirty-two bit data word D (which is one of the operands OP0, OP1, shown in FIG. 3), input carry bit C from the FLAGS IN bus, and one or more bits presented by instruction logic 70 on lines DEX, generated as will be described hereinbelow.

Figure 5:
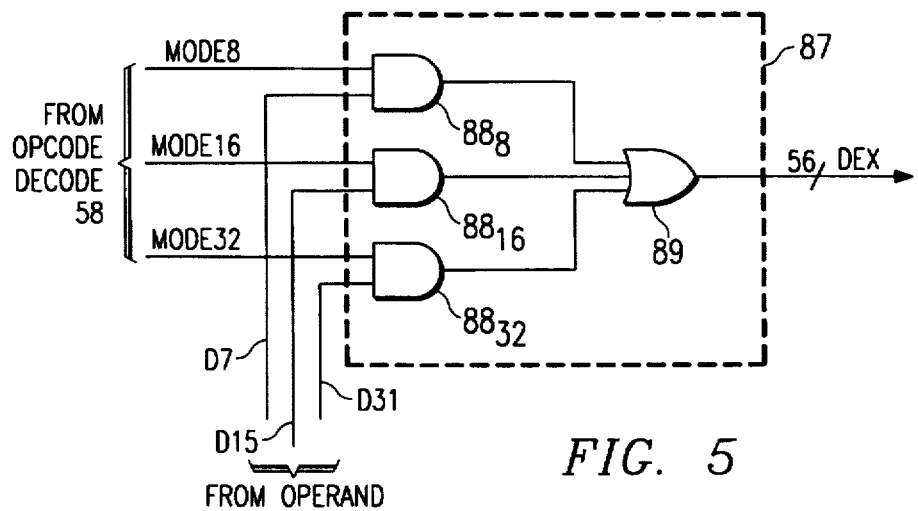
FIG. 5 is an electrical diagram, in schematic form, of a portion of the instruction logic for generating sign bit extensions, in the shifter of FIG. 4.

Lines DEX present multiple copies of the sign bit to multiple inputs of multiplexers 72, 74, 76, for use in executing the arithmetic shifts described hereinabove. Instruction logic 70, along with generating the multiplexer control signals as will be described hereinbelow, generates the signals on lines DEX by way of extend logic 87 illustrated in FIG. 5, as will now be described. Extend logic 87 receives mode signals MODE8, MODE16, MODE32 from opcode decode 58; mode signals MODE8, MODE16, MODE32 are asserted in a mutually exclusive fashion from one another, and indicate, when asserted, that the current instruction is an 8-bit, 16-bit, or 32-bit instruction, respectively. Signals MODE8, MODE16, MODE32 are presented to an input of AND gates $88_8$, $88_{16}$, $88_{32}$, respectively. AND gates $88_8$, $88_{16}$, $88_{32}$ each receive, at their other input, one bit from data word D, specifically the sign bit for the corresponding data word width. As such, AND gates $88_8$, $88_{16}$, $88_{32}$, receive data word input bits D7, D15, D31, respectively (which correspond to the sign bit in 8-bit, 16-bit, and 32-bit data words, respectively). The outputs of AND gates $88_8$, $88_{16}$, $88_{32}$ are presented to inputs of OR gate 89, which drives bus DEX at its output. In this example, since the sign bit may be presented to up to the most significant fifty-six inputs of first funnel shifter stage 80, bus DEX is effectively fifty-six bits wide (i.e., bus DEX either is a single line presented to a total fifty-six inputs of multiplexers 72, 74, 76, or is a bus that is fifty-six bits wide).

In this embodiment of the invention, top multiplexer 72 presents top input bits T0 through T32 at its outputs, for communication to first funnel shifter stage 80. First bottom multiplexer 74 presents the sixteen most significant bottom input bits B16 through B31 to first funnel shifter stage 80. Second bottom multiplexer 76 presents the bottom input bits B8 through B15 to first funnel shifter stage 80, and bottom bottom multiplexer 78 presents the least significant bottom input bits B0 through B7 to first funnel shifter stage 80.

In connection with the preferred embodiment of the invention, shifter 50 provides numerous efficiencies for the shift and rotate instructions described above and that are in the standard instruction set of x86-architecture microprocessors. The efficiencies are utilized in the preferred embodiment of the invention, in the organization of the inputs presented to multiplexers 72, 74, 76, 78. In addition, as will be apparent from the following description, construction of multiplexers 72, 74, 76, 78 by way of AND-OR-INVERT functions provides additional efficiencies, especially in the presentation of don't care values as zeroes without requiring a data input or control signal to do so. These efficiencies, and their use in shifter 50 according to the preferred embodiment of the invention, will now be described in detail.

According to the preferred embodiment of the invention, top multiplexer 72 selects from among the following inputs in executing the shift and rotate instructions, under the control of the signals indicated hereinbelow. In the following table, the inputs will be specified in order from T32 through T0; for example, in the first row of the following table, topmost input bit T32 will receive the carry bit, and top input bits T31 through T0 will receive data input word bits D31 through D0, respectively. Those instances for which a bit is repeatedly applied to an input are indicated by a ● symbol; for example, in the second row of the following table, topmost input bit D32 receives a 0 value, and the remaining top input bits T31 through T0 receive a copy of the sign bit as presented on bus DEX:

| Selected inputs | Instructions | Control signal |
|---|---|---|
| C; D31-D0 | SHL, ROT(32) | SELD$_{TOP}$ |
| 0; 32·DEX | SAR(8), SAR(16), SAR(32) | SELDX$_{TOP}$ |
| 24-0;D4-D0; C; D7-D5 | RCR(8) | RCR8 |
| 16-0; D14-D0; C; D15 | RCR(16) | RCR16 |
| D31-D0; C | RCR(32) | RCR32 |
| 24-0; C; D7-D0 | RCL(8) | RCL8 |
| 16-0; C; D15-D0 | RCL(16) | RCL16 |
| 33-0 | SHR, ROT(8), ROT(16) | (none) |

Figure 6:
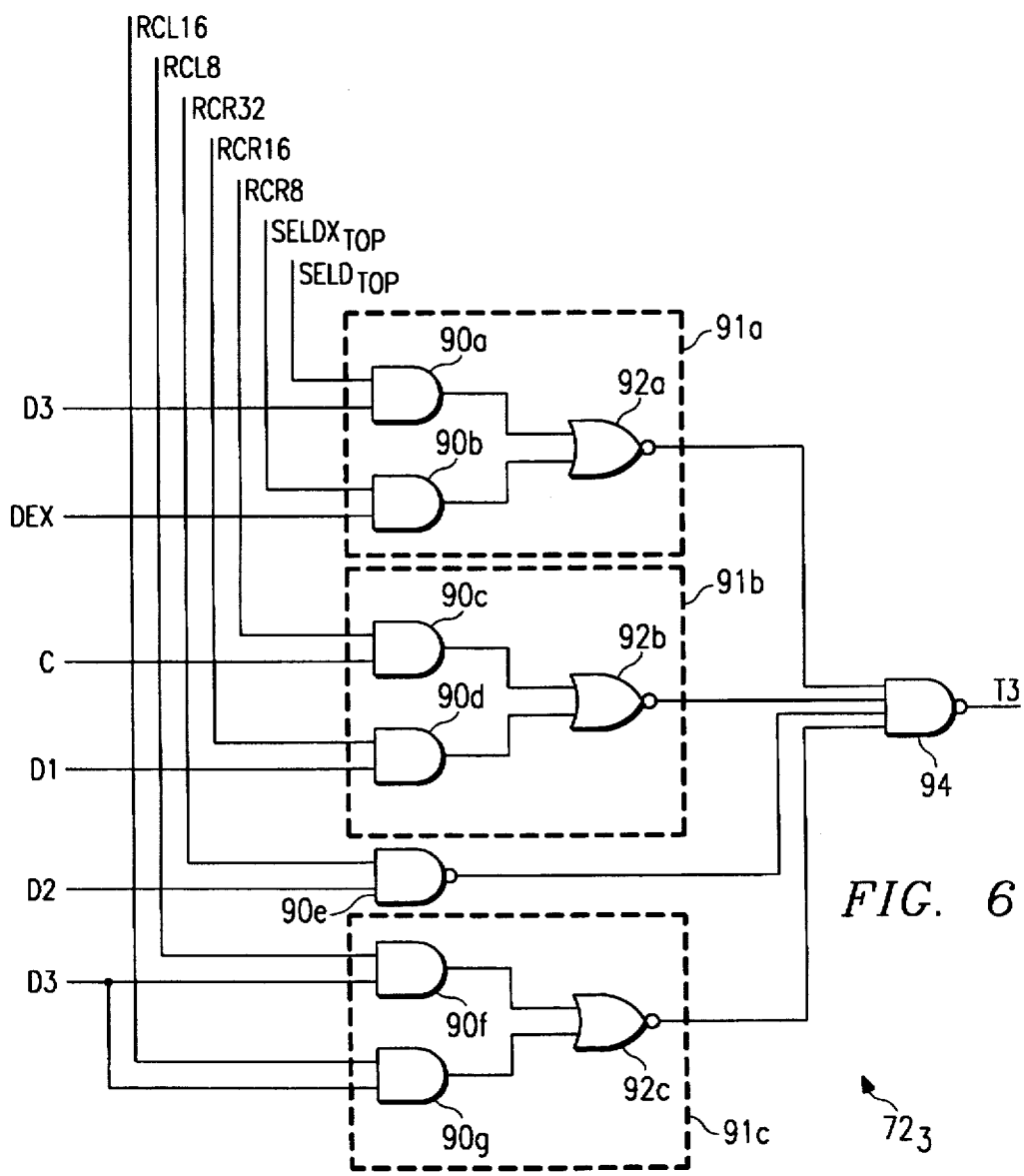
FIG. 6 is an electrical diagram, in schematic form, of a bit position multiplexer circuit of one of the input multiplexers of FIG. 4.

As noted hereinabove, multiplexers 72, 74, 76, 78 may all be realized as AND-OR-INVERT functions associated with each bit position of their respective outputs. Referring to FIG. 6, the construction of a bit position multiplexer 72$_3$ in top multiplexer 72, specifically the bit position multiplexer that produces the output bit serving as top input bit T3, will now be described, to provide an example of the construction of each of multiplexers 72, 74, 76, 78.

As shown in FIG. 6, bit position multiplexer 72$_3$ includes seven AND (or NAND) gates 90, corresponding to the seven possible inputs to multiplexer 72 that may be presented as top input bit T3. Each AND gate 90 performs the logical AND of one of these possible input bits with the corresponding control signal. With reference to the above table, AND gate 90a receives data input bit D3 and control signal SELD$_{TOP}$, so that the logic level of data input bit D3 is presented at the output of AND gate 90a in the execution of the SHL and ROT(32) instructions. The TOP subscript indicates that the selection of data word D may be provided to top multiplexer 72 in the execution of instructions that may be different from those in which the data word is selected in the other multiplexers. Similarly, AND gate 90b receives data extend bit DEX and control signal SELDX$_{TOP}$ (activated for the SAR(8), SAR(16), and SAR (32) instructions), AND gate 90c receives the carry bit and control signal RCR8, AND gate 90d receives data input bit D1 and control signal RCR16, and AND gates 90f and 90g each receive data input bit D3 and control signals RCL8, RCL16, respectively. NAND gate 90e receives data input bit D2 and control signal RCR32 at its inputs. For certain bit positions, some functional signals may be combined if desired; for the example of top input bit T3, the functions of AND gates 90f, 90g could be combined into a single AND function controlled by the logical OR of control signals RCL8 and RCL16, if desired. Of course, such combining may not be available, for any pair of functions, at each bit position.

The outputs of AND gates 90a, 90b, 90c, 90d, 90f, 90g are combined by way of two-input NOR gates 92a through 92c, the outputs of which are presented to the inputs of NAND gate 94, which drives top input bit T3 at its output. A fourth input to NAND gate 94 is presented by the output of NAND gate 90e, as an odd number of logical combinations are required for top input bit T3. As such, top input bit T3 is the logical OR of the outputs of AND gates 90a through 90g. Since only one of the control signals are driven at any one time, depending upon the instruction being executed, top input bit T3 will thus receive the selected data input for the appropriate instructions.

Certain economies of realization may be adopted in implementing the bit position multiplexers according to this embodiment of the invention. For example, as shown in FIG. 6, AND gates 90a, 90b and NOR gate 92a may be implemented as a single AND-OR-INVERT logic function 91a; similarly, gates 90c, 90d, 92b may be implemented as AND-OR-INVERT function 91b, and gates 90f, 90g, 92c may be implemented as AND-OR-INVERT function 91c.

While the example of FIG. 6 is provided for a single bit T3 in top multiplexer 72, it is contemplated that one of ordinary skill in the art, having reference to this specification, will be readily able to construct multiplexers 72, 74, 76, 78 in similar fashion.

The realization of multiplexers 72, 74, 76, 78 in this fashion provides many important efficiencies in the construction of shifter 50. Firstly, it will be noted that no control signals are provided to top multiplexer 72 for the SHR, ROT(8) and ROT(16) instructions. This is because the top input bits T32 through T0 presented in these instructions are either 0s or don't cares (assuming that the maximum shift counts for the SAR(8) and SAR(16) shifts are seven and fifteen bits, respectively). According to this preferred embodiment of the invention, all input don't cares are realized as 0 logic levels. The construction of multiplexers 72, 74, 76, 78 in AND-OR-INVERT fashion allows the selection of a 0 logic level as an input, for a given instruction, to be realized merely by the absence of a control signal corresponding to that instruction. For example, if none of the control signals SELD, SELDX, RCR8, RCR16, RCR32, RCL8, RCL16 are asserted (i.e., the instruction being executed is one of the SHR, ROT(8) and ROT(16) instructions), top input bit T3 shown in FIG. 6 will necessarily be a 0 logic level, since the output of all of AND gates 90 will be at a 0 logic level. The construction of multiplexers 72, 74, 76, 78 in this fashion thus provides significant efficiencies in layout, considering that control signals need not be provided thereto for those instructions in which either a 0 or don't care condition is desired. The chip area and layout complexity required in the realization of shifter 50 may thus be quite reduced from that required for conventional barrel shifters.

In addition, the AND-OR-INVERT realization of multiplexers 72, 74, 76, 78 according to the preferred embodiment of the invention also eliminates the need for complementary control signals, as would be required if multiplexers were implemented as pass gates, as is typical in shifters. Further in addition, the realization of multiplexers 72, 74, 76, 78 in this fashion eliminates the possibility of crowbar current during scan testing, as the control signals can be set up from registers to ensure that no more than one data input is selected during scan testing.

In addition, many efficiencies may be used to advantage considering the possible operations to be performed by shifter 50. For example, as noted above relative to FIGS. 3k through 3n, the most significant sixteen top input bits T17 through T32 will not be involved in eight-bit or sixteen-bit rotates through carry. As such, referring to FIG. 6 by way of example, those sixteen top input bit positions need not include, in their input respective portion of input multiplexer 72, the logic required by AND-OR-INVERT functions 91b, 91c. This reduction in logic will, of course, save a corresponding amount of integrated circuit chip area.

In similar fashion, the inputs from which first bottom multiplexer 74 selects the sixteen bits to be presented as bottom input bits B31 through B16 are controlled according to control signals (not shown in FIG. 4) generated by instruction logic 70 based upon the instruction to be executed as follows:

| Selected inputs | Instructions |
| --- | --- |
| D31-D16 | SHR, SAR(32), ROT(32),RCR(32) |
| 16-DEX | SAR(16), SAR(8) |
| D15-D0 | ROT(16) |
| D4-D0; C; D7-D0; C; D7 | RCR(8) |
| D14-D0; C | RCR(16) |
| C; D7-D0; C; D7-D2 | RCL(8) |
| C; D15-D1 | RCL(16) |
| C; D31-D17 | RCL(32) |
| 8-0 | SHL, ROT(8) |

Since execution of the instructions SHL and ROT(8) present either 0s or don't cares to bottom input bits B31 through B16, no control signals are necessary for these instructions, due to the realization of multiplexer 74 as AND-OR-INVERT functions.

Second bottom multiplexer 76 selects among the following inputs for presentation as bottom input bits B15 through B8 under the control of control signals (not shown) decoded from the x86instructions described hereinabove, and according to the following relationship:

| Selected inputs | Instructions |
| --- | --- |
| D15-D8 | SHR, SAR(16), SAR(32), ROT(16), ROT(32), |
| 8-DEX | RCR(16), RCR(32) |

-continued

| Selected inputs | Instructions |
| --- | --- |
| D7-D0 | SAR(8) |
| D6-D0; C | ROT(8) |
| D1; D0; C; D7-D3 | RCR(8) |
| D0; C; D15-D10 | RCL(16) |
| D16-D9 | RCL(32) |
| 8-0 | SHL |

No control signal is required for the execution of the SHL instruction for multiplexer 76, as all zeroes are presented to bottom input bits B15 through B8 in its execution.

Finally, bottom bottom multiplexer 78 selects among the various inputs based upon control signals (not shown) decoded from the instructions according to the following relationships:

| Selected inputs | Instructions |
| --- | --- |
| D7-D0 | SHR, SAR(8), SAR(16), SAR(32), ROT(8), ROT(16), ROT(32), RCR(8), RCR(16), RCR(32) |
| D2-D0; C; D7-D4 | RCL(8) |
| D9-D2 | RCL(16) |
| D8-D1 | RCL(32) |
| 8-0 | SHL |

The SHL instruction, as it presents all zeroes to bottommost input bits B7 through B0, needs no control signal in this embodiment of the invention.

From the above tables, it may be noted that certain of the control signals, particularly those based upon the RCR and RCL instructions, apply only to a single instruction. As a result, these control signals may be generated by instruction logic 70 on a single line, and applied to all multiplexers 72, 74, 76, 78. Further efficiency may be derived in the realization of multiplexers 72, 74, 76, 78 by interleaving (i.e., bit positions from different ones of multiplexers 72, 74, 76, 78 being adjacent to one another).

Figure 7:
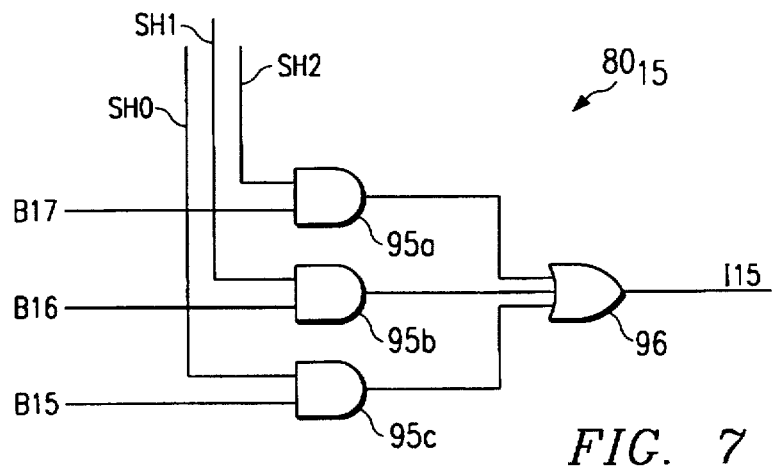
FIG. 7 is an electrical diagram, in schematic form, of a portion of the first funnel shifter stage of the shifter of FIG. 4.

According to the foregoing description, top input bits T32 through T0 and bottom input bits B31 through B0 are applied to first funnel shifter stage 80 in shifter 50, from which sixty-three contiguous bits are selected and presented to second funnel shifter stage 82 on bus I, according to the particular instruction to be executed. First funnel shifter stage 80 is preferably also implemented as a set of sixty-three single-bit multiplexers, preferably realized as AND-OR-INVERT functions as described above. Of course, other implementations of funnel shifter stage 80 may alternatively be used, such as pass-transistor-based multiplexers. In this example, first funnel shifter stage 80 is operable to effect a zero, one, or two-bit shift; as such, each output bit position in funnel shifter stage 80 has three inputs. FIG. 7 illustrates the construction of a single bit position portion $80_{15}$ of first funnel shifter stage 80, for generating bit I15 on bus I, constructed as combinational logic utilizing AND and OR functions; of course, portion $80_{15}$ of first funnel shifter stage 80 may be implemented via NAND-NAND functions, if desired.

As shown in FIG. 7, portion $80_{15}$ of first funnel shifter stage 80 receives three data input bits, namely B17, B16, B15, each at an input of AND gates 95a, 95b, 95c, respectively. Control signals SH2, SH1, SH0 are presented to inputs of AND gates 95a, 95b, 95c, respectively, and are mutually exclusive of one another so that only a single one of the three data inputs will be generated and presented as output bit I15. Accordingly, control signal SH2 is asserted if a right shift of two-bits by first funnel shifter stage 80 is to be effected, with control signals SH1, SH0 asserted if right shifts by one or zero bits, respectively, is to be effected by first funnel shifter stage 80.

Figure 8:
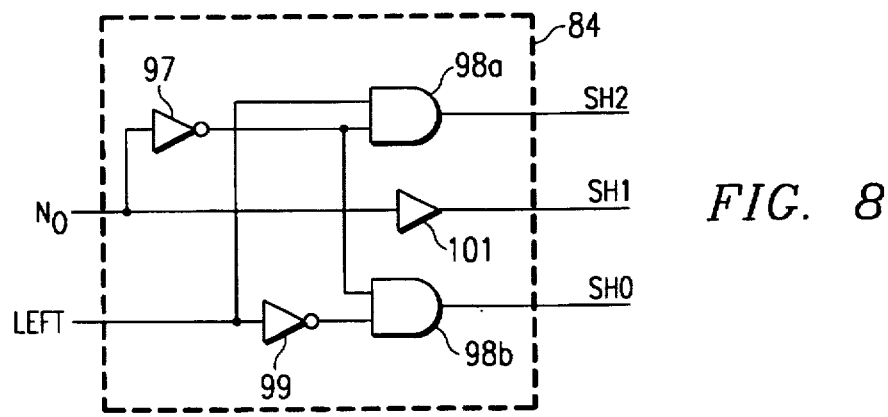
FIG. 8 is an electrical diagram, in schematic form, of the stage shift logic in the shifter circuit of FIG. 4.

Control signals SH2 through SH0 are generated by stage shift logic 84 according to the direction and count of the shift or rotate instruction to be executed. Stage shift logic 84 may be implemented as two levels of NAND gates, or alternatively as an AND-OR-INVERT function followed by an inverter. For right shifts and rotates, shifter 50 (first funnel shifter stage 80 plus second funnel shifter stage 82) performs a shift by N, which is the shift count in shift count register 75. However, for left shifts and rotates, as discussed above relative to FIGS. 3a through 3n, shifter 50 shifts right by the amount 32–N, after the data has been shifted left by 32 positions. The determination of the amount 32–N is cumbersome, however, in that an adder is necessary to perform the subtraction. According to this embodiment of the invention, therefore, the shift right of 32–N is performed, for left shifts and rotates, by unconditionally shifting right by one bit position followed by a right shift of $\overline{N}$, since $\overline{N}$ equals (31–N). This unconditional right shift by one bit position for left shifts and rotates is effected by first funnel shifter stage 80, as will now be described relative to FIG. 8, which illustrates the construction of stage shift logic 84 that generates these control signals SH2 through SH0.

Stage shift logic 84 provides control signals SH2, SH1, SH0 based upon shift direction signal LEFT presented by opcode decode 58, and the least significant bit $N_0$ of shift count N (i.e., the bit that indicates whether the shift count N is odd or even) from shift count register 75. The following table illustrates the operations and logic signals of FIG. 8 upon which stage shift logic 84 operates:

| Operation | Signals asserted | Control output |
|---|---|---|
| Left shift with N odd | LEFT; $N_0$=1 | SH1 |
| Left shift with N even | LEFT; $N_0$=0 | SH2 |
| Right shift with N odd | $\overline{\text{LEFT}}$; $N_0$=1 | SH1 |
| Right shift with N even | $\overline{\text{LEFT}}$; $N_0$=0 | SH0 |

Control signals SH2, SH1, SH0 are generated so as to always shift right by an additional single bit position in the event of a left shift or rotate instruction (i.e., signal LEFT is asserted). Accordingly, in the event of an odd shift count for a left shift or rotate, first funnel shifter stage 80 will shift right by one place (considering that $\overline{N}_0$=0 for an odd shift count). First funnel shifter stage 80 will shift by two positions in the event of a left shift by an even amount ($\overline{N}_0$=1), will shift by one position for either a left or right shift by an odd amount, and will shift by zero positions in the event of a right shift by an even amount. Accordingly, logic portion 100 includes AND gate 98a to produce control signal SH2, which is the logical AND of shift count bit $\overline{N}_0$ and the LEFT control signal (i.e., the right shift is by two bit positions for even left shifts only). Buffer 101 merely repeats the state of bit $N_0$ as control signal SH1 (considering that either an odd right shift or an odd left shift will require a one bit right shift). AND gate 98b produces control signal SH0 as the logical AND of bit $\overline{N}_0$ and the logical complement of the LEFT control signal, ensuring that no shift is performed in the event of an even right shift.

As noted above, and as illustrated in FIG. 4, the output bus I is presented to second funnel shifter stage 82, for additional shifting according to the shift count N and the direction of shifting. In this example, second funnel shifter stage 82 presents a thirty-three bit output (O33 through O0, as described hereinabove) depending upon the sixty-three bits (I62 through I0) presented thereto on bus I, and shifted by an amount ranging from zero bit positions to thirty bit positions, varying by increments of two. Only even-numbered shifts need be performed by second funnel shifter stage 82, considering that odd shift values have been handled by first funnel shifter stage 80. As such, sixteen selection control signals are generated by shift decoder 86, based upon the shift count N and the direction of shift, as will now be described relative to FIG. 9.

Figure 9:
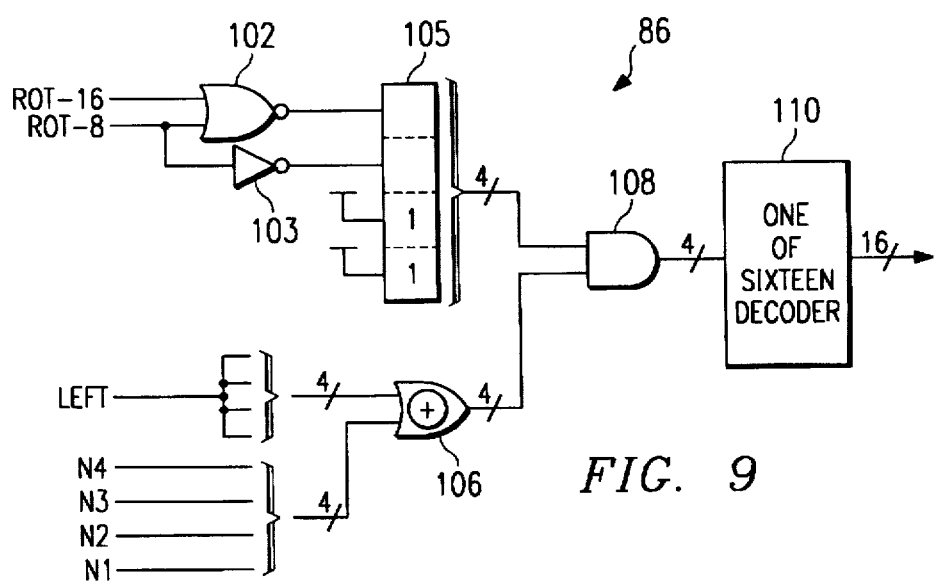
FIG. 9 is an electrical diagram, in schematic form, of the shift decoder in the shifter circuit of FIG. 4.

FIG. 9 illustrates the construction of shift decoder 86 that generates the sixteen control signals to second funnel shifter stage 82, according to the preferred embodiment of the invention. Shift decoder 86 receives the four most significant bits of shift count N (i.e., bits $N_4$ through $N_1$) from shift count register 75, as well as shift direction signal LEFT (copied to four lines, as shown in FIG. 9). The four copies of shift direction signal LEFT are exclusive-ORed with the four most-significant bits of shift count N by exclusive-OR function 106, on a bit-by-bit basis. As a result, the output of exclusive-OR function 106 constitutes the four most significant bits of shift count N for right shifts (LEFT being low), and the logical complement of the four most significant bits of shift count N for left shifts (LEFT being high). As described hereinabove, the logical complement of the shift count N is useful in left shifts and rotates, considering the performance of the unconditional one-bit right shift by first funnel shifter stage 80 in the case of left shifts.

Shift decode 86 further receives lines ROT-16 and ROT-8 from instruction logic 70, which indicate whether the instruction being executed is either a sixteen-bit or an eight-bit arithmetic shift or rotate, respectively. In these cases, as noted above, the maximum shift count is fifteen or seven bit positions, respectively; as such, the most significant bits of shift count N may be ignored in the operation of second funnel shifter stage 82. Shift decoder 86 thus has a shift mask 105, which is a four bit signal in which the least two significant bits are set to a logical 1. The third-most significant bit of shift mask 105 corresponds to the logical complement of the ROT-8 signal (via inverter 103), and is thus set to 1 only if the instruction is not an 8-bit rotate instruction; the most significant bit of shift mask 105 corresponds to the NOR of the ROT-16 and ROT-8 signals, and is thus set to 1 only if the instruction is neither a 16-bit rotate instruction nor an 8-bit rotate instruction.

The contents of shift mask 105 are applied, bit-by-bit, to the four output bits of exclusive-OR function 106, by logical AND function 108; alternatively, since the two LSBs of the shift mask 105 are both logical 1, the two outputs of exclusive-OR function 106 may directly be used as the two LSBs of the output signal. As such, the value of those bits of the shift count N from exclusive-OR 106 (i.e., either N or $\overline{N}$, depending upon the shift direction) that are not masked by a 0 state in the corresponding bit position of shift mask 105 is a four-bit digital signal that indicates the magnitude of the shift to be performed by second funnel shifter stage 82. This four-bit value is applied to decoder 110, which produces sixteen output lines, one for each possible shift value from zero bit positions to thirty bit positions, counting by twos. One and only one of the outputs of decoder 110 is asserted for a given instruction. The output of decoder 110 is then applied to second funnel shifter stage 82, to effect the appropriate shift.

Second funnel shifter stage 82 may be realized as AND-OR-INVERT functions, although other realizations, including pass-gate logic implementations, may alternatively be used. Based upon the amount of shift to be effected by second funnel shifter stage 82, the appropriate result is then presented to results multiplexer 59, with the appropriate flags generated by flag logic 85 and applied to flags multiplexer 60.

Alternative implementations of shifter 50 may be utilized according to the present invention. The above description is implemented by way of a first stage 80 that responds to the least significant shift count bit, followed by second stage 82 responsive to the remaining four shift count bits (in the case of a maximum shift of thirty-one bit positions). Alternatively, one could implement the first stage as responsive to the least two significant bits (including, of course, the additional shift required for left shift and rotate instructions), in combination with a second stage responsive to the remaining three shift count bits. Such an implementation, for the first stage, would involve a shift by from zero to four bits, depending upon the direction of the shift or rotate instruction, and also upon the two least significant bits of the shift count. The shift control would be implemented, in this case, according to the following table:

| Direction | LSBs of shift count | Count | Total shift |
|---|---|---|---|
| Right | 00 | 0 | 0 |
| Right | 01 | 1 | 1 |
| Right | 10 | 2 | 2 |
| Right | 11 | 3 | 3 |
| Left | 00 | 3+1 | 4 |
| Left | 01 | 2+1 | 3 |
| Left | 10 | 1+1 | 2 |
| Left | 11 | 0+1 | 1 |

In this example, the value "Count" corresponds to the value of the two LSBs of the shift count N for right shifts and rotates, and corresponds to the value of the complement of the two LSBs of the shift count N plus one for left shifts and rotates. The value "Total shift" is thus the number of bit positions that the first shifter stage would shift the output of the input multiplexers 72, 74, 76, 78 in this embodiment of the invention.

The selection of the particular implementation will typically require a tradeoff between the increased speed provided by a smaller second stage multiplexer and the increased time required to generate additional first stage controls. It is contemplated that one of ordinary skill in the art will be readily able to make this tradeoff and implement this and other alternative realizations of the shifter according to the present invention, with reference to this specification.

Numerous advantages are provided by the shifter circuit construction and operation according to the present invention. Firstly, many efficiencies in the performance of a wide range of shift and rotate operations, with and without carry bits, and of various word widths, are used to advantage in the configuration of the shifter circuit according to the present invention. These advantages are made further efficient by the implementation of the shifter input multiplexers and shifter stages as AND-OR-INVERT functions, which allow for 0 logic level inputs to be ignored (from the standpoint of control signal generation), enabling single-ended control signals, and eliminating the potential for crowbar current in scan test and otherwise. Use of the logical complement of the shift count in the execution of left shift instructions is also enabled by the present invention, thus avoiding the necessity of a subtraction operation to derive the shift count.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A shifter circuit in an integrated circuit, for performing shift operations upon operands of variable word lengths responsive to an instruction code, comprising:

a input multiplexer circuit comprising a plurality of bit position multiplexers, each bit position multiplexer having a plurality of data inputs for receiving the state of a plurality of operand bit positions, wherein each of a most significant group of the bit position multiplexers also has a data input for receiving a sign bit, wherein each of a selected group of the bit position multiplexers also has a data input for receiving a carry bit, and wherein each bit position multiplexer has an output for presenting a signal corresponding to a selected one of its data inputs responsive to one of a plurality of multiplexer control signals;

a funnel shifter, having a plurality of inputs aligned with the outputs of the input multiplexer circuit, for presenting a sequence of the outputs of the bit position multiplexer on a results bus, the sequence being selected responsive to a plurality of shift control signals; and shifter control logic, for generating the multiplexer control signals responsive to portions of the instruction code indicating the word length of the operand and the type and direction of a shift to be performed by the shifter circuit, and for generating shift control signals responsive to portions of the instruction code indicating the word length of the operand, the type of the shift to be performed by the shifter circuit, and a shift count corresponding to the magnitude of the shift to be performed by the shifter circuit.

2. The shifter circuit of claim 1, wherein the funnel shifter comprises:

a first funnel shifter stage having a plurality of inputs aligned with the outputs of the plurality of bit position multiplexers, the first funnel shifter stage for presenting, at first stage outputs, a selected sequence of its inputs responsive to one of a plurality of first stage shift control signals, wherein the sequences selected by the first funnel shifter stage include shifts in a first direction of from zero bit positions to a first limit; and a second funnel shifter stage, having a plurality of inputs aligned with the first stage outputs, the second funnel shifter stage for presenting a selected sequence of its inputs on the results bus responsive to a plurality of second stage shift control signals.

3. The shifter circuit of claim 2, wherein the shifter control logic comprises:

a stage shift logic circuit, having inputs for receiving a shift direction signal indicating whether the shift is in a first direction or in a second direction, and for receiving the least significant bit of the shift count, the stage shift logic circuit for generating a zero shift control signal responsive to the shift direction signal indicating a shift in the first direction and to the least significant shift count bit being a zero, for generating a one-bit shift control signal responsive to the least significant shift count bit being a one, and a two-bit shift control signal responsive to the shift direction signal indicating a shift in the second direction and to the least significant shift count bit being a zero.

4. The shifter circuit of claim 3, wherein the shifter control logic further comprises:

a shift decode circuit, comprising:

a shift count inverting circuit, having a plurality of inputs for receiving a most significant portion of the shift count, and having a plurality of inputs for receiving the shift direction signal, the shift count negating circuit for logically inverting the most significant portion of the shift count responsive to the shift direction signal indicating a shift in the second direction; and a decoder, for decoding the output of the shift count inverting circuit into the second stage shift control signals.

5. The shifter circuit of claim 1, wherein the multiplexer control signals presented to each of the plurality of bit position multiplexers are mutually exclusive of one another so that at most one of the multiplexer control signals presented to each of the bit position multiplexers is asserted for an instruction;

and wherein each of the bit position multiplexers comprises:

a plurality of input gates, for gating one of the plurality of data inputs with one of the multiplexer control signals; and a logical OR function, connected to the outputs of each of the input gates, for producing an output signal corresponding to the logical OR state of the input data bit associated with the asserted one of the multiplexer control signals.

6. The shifter circuit of claim 5, wherein each of the bit position multiplexers presents a logic zero level at its output responsive to none of its associated multiplexer control signals being asserted.

7. The shifter circuit of claim 6, wherein the number of the bit position multiplexers in the input multiplexer circuit is at least twice the number of bits in the largest of the variable word lengths.

8. The shifter circuit of claim 1, wherein the shifter circuit is operable responsive to a plurality of instruction types comprising logical shifts in the first and second directions, and arithmetic shifts in the first direction.

9. The shifter circuit of claim 1, wherein the shifter circuit is operable responsive to a plurality of instruction types comprising rotate-through-carry instructions in the first and second directions.

10. The shifter circuit of claim 1, wherein the shifter circuit is operable responsive to a plurality of instruction types comprising rotate instructions in the first and second directions.

11. A method of operating a microprocessor to execute a selected one of a set of shift and rotate instructions upon an operand word of variable length, the set of shift and rotate instructions comprising logical shifts, logical rotates, and rotate-through-carry operations in either of a first or second direction, and arithmetic shifts in the first direction, the method comprising:

decoding an instruction code corresponding to the selected instruction to determine the type of operation to be executed, the direction of the operation, the operand word length, and a shift count;

applying, to an input multiplexer stage, a plurality of inputs corresponding to the operand word, a plurality of copies of a carry bit, and a plurality of copies of a sign bit;

controlling the input multiplexer stage responsive to the decoded instruction code, so that the input multiplexer stage presents a set of data inputs to a funnel shifter responsive to the value of the operand word and to the decoded instruction code, and controlling the funnel shifter to shift the output of the input multiplexer stage in the first direction by an amount determined responsive to the shift count and to the direction of the operation.

12. The method of claim 11, wherein the input multiplexer stage comprises a plurality of bit position multiplexers, each bit position multiplexer having an output coupled to an input of the funnel shifter, each bit position multiplexer having a plurality of data inputs for receiving a data signal from a plurality of bits in the operand, each of a most significant group of bit position multiplexers also having a data input for receiving a sign bit of said copies of a sign bit, and each of a selected group of bit position multiplexers also having a data input for receiving a carry bit of said copies of a carry bit and wherein the step of controlling the input multiplexer stage comprises:

applying a multiplexer control signal to each of the bit position multiplexers, so that each of the bit position multiplexers selects one of its data inputs for coupling to the associated funnel shifter input responsive to the multiplexer control signal.

13. The method of claim 12, wherein the step of controlling the input multiplexer stage comprises, for at least one of the instructions:

controlling at least a most significant bit position multiplexer to apply a zero logic level to its associated input of the funnel shifter, by not asserting any control signal to the most significant bit position multiplexer.

14. The method of claim 11, wherein the decoding step further decodes the instruction code to determine the data word length of the operand.

15. The method of claim 14, wherein the step of controlling the input multiplexer stage is also performed responsive to the data word length of the operand.

16. The method of claim 14, further comprising:

generating a shift mask value responsive to determining of the data word length of the instruction;

applying the shift mask value to the shift count in the step of controlling the funnel shifter, to limit the shift count for instructions for data word lengths below the maximum.

17. A microprocessor, comprising:

instruction decode circuitry, for decoding instructions from an instruction into control signals, the instruction set comprising shift and rotate instructions of a plurality of types upon an operand word of variable data word lengths, the types of shift and rotate instructions comprising logical shifts, logical rotates, and rotate-through-carry operations in either of a first or second direction, and arithmetic shifts in the first direction;

a bus interface circuit, for communicating data between the microprocessor and devices external thereto;

an arithmetic logic unit, coupled to the instruction decode circuitry and to the bus interface circuit, comprising:

adder circuitry; and a shifter circuit, comprising:

a input multiplexer circuit comprising a plurality of bit position multiplexers, each bit position multiplexer having a plurality of data inputs for receiving the state of a plurality of operand bit positions, wherein each of a most significant group of the bit position multiplexers also has a data input for receiving a sign bit, wherein each of a selected group of the bit position multiplexers also has a data input for receiving a carry bit, and wherein each bit position multiplexer has an output for presenting a signal corresponding to a selected one of its data inputs responsive to one of a plurality of multiplexer control signals;

a funnel shifter, having a plurality of inputs aligned with the outputs of the input multiplexer circuit, for presenting a sequence of the bit position multiplexer outputs on a results bus, selected responsive to a plurality of shift control signals; and shifter control logic, for generating the multiplexer control signals and shift control signals responsive to portions of the instruction code indicating the word length of the operand, indicating the type of the shift and rotate instruction to be performed by the shifter circuit, and responsive to a shift count corresponding to the magnitude of a shift to be performed by the shifter circuit.

18. The microprocessor of claim 17, wherein the funnel shifter comprises:

a first funnel shifter stage having a plurality of inputs aligned with the outputs of the plurality of bit position multiplexers, the first funnel shifter stage for presenting, at first stage outputs, a selected sequence of its inputs responsive to one of a plurality of first stage shift control signals, wherein the sequences selected by the first funnel shifter stage include shifts in a first direction of from zero bit positions to a first limit; and a second funnel shifter stage, having a plurality of inputs aligned with the first stage outputs, the second funnel shifter stage for presenting a selected sequence of its inputs on the results bus responsive to a plurality of second stage shift control signals;

wherein the shifter control logic comprises:

a stage shift logic circuit, having inputs for receiving a shift direction signal indicating whether the shift is in a first direction or in a second direction, and for receiving the least significant bit of the shift count, the stage shift logic circuit for generating a zero shift control signal responsive to the shift direction signal indicating a shift in the first direction and to the least significant shift count bit being a zero, for generating a one-bit shift control signal responsive to the least significant shift count bit being a one, and a two-bit shift control signal responsive to the shift direction signal indicating a shift in the second direction and to the least significant shift count bit being a zero;

a shift count inverting circuit, having a plurality of inputs for receiving a most significant portion of the shift count, and having a plurality of inputs for receiving the shift direction signal, the shift count negating circuit for logically inverting the most significant portion of the shift count responsive to the shift direction signal indicating a shift in the second direction; and a decoder, for decoding the output of the shift count inverting circuit into the second stage shift control signals.

19. The microprocessor of claim 17, wherein the multiplexer control signals presented to each of the bit position multiplexers are mutually exclusive of one another so that at most one of the multiplexer control signals presented to each of the bit position multiplexers is asserted for an instruction; and wherein each of the bit position multiplexers comprises:

a plurality of input gates, for gating one of the plurality of data inputs with one of the multiplexer control signals; and a logical OR function, connected to the outputs of each of the input gates, for producing an output signal corresponding to the logical OR state of the input data bit associated with the asserted one of the multiplexer control signals.

20. The microprocessor of claim 19, wherein each of the bit position multiplexers presents a logic zero level responsive to none of its associated multiplexer control signals being asserted.

* * * * *